(12) United States Patent
Antonetti

(10) Patent No.: US 12,191,933 B2
(45) Date of Patent: Jan. 7, 2025

(54) NFC ANTENNA

(71) Applicant: STMicroelectronics Austria GmbH, Graz (AT)

(72) Inventor: Francesco Antonetti, Graz (AT)

(73) Assignee: STMicroelectronics Austria GmbH, Graz (AT)

(*) Notice: Subject to any disclaimer, the term of this patent is extended or adjusted under 35 U.S.C. 154(b) by 274 days.

(21) Appl. No.: 17/453,425

(22) Filed: Nov. 3, 2021

(65) Prior Publication Data

US 2022/0060217 A1 Feb. 24, 2022

Related U.S. Application Data

(63) Continuation of application No. 16/850,383, filed on Apr. 16, 2020, now Pat. No. 11,218,191.

(30) Foreign Application Priority Data

Apr. 30, 2019 (EP) .................................... 19171840

(51) Int. Cl.
| | | |
|---|---|---|
| H04B 5/72 | (2024.01) | |
| G06Q 20/20 | (2012.01) | |
| H01Q 1/24 | (2006.01) | |
| H01Q 1/38 | (2006.01) | |
| H01Q 7/00 | (2006.01) | |
| H04B 5/26 | (2024.01) | |

(52) U.S. Cl.
CPC .............. *H04B 5/72* (2024.01); *G06Q 20/20* (2013.01); *H01Q 1/243* (2013.01); *H01Q 1/38* (2013.01); *H01Q 7/00* (2013.01); *H04B 5/26* (2024.01)

(58) Field of Classification Search
CPC .... H04B 5/0031; H04B 5/0081; G06Q 20/20; H01Q 1/243; H01Q 1/38; H01Q 7/00
USPC .......................................................... 455/41.1
See application file for complete search history.

(56) References Cited

U.S. PATENT DOCUMENTS

| | | | | |
|---|---|---|---|---|
| 10,340,573 | B2* | 7/2019 | Johnson | H01Q 13/106 |
| 10,410,202 | B1* | 9/2019 | Ng | G06F 1/30 |
| 11,043,751 | B2* | 6/2021 | Antonetti | H04W 4/80 |
| 11,626,241 | B2* | 4/2023 | Hong | H01F 27/32 |
| | | | | 336/192 |
| 11,770,031 | B2* | 9/2023 | Peralta | H04B 5/79 |
| | | | | 307/104 |
| 2014/0129425 | A1* | 5/2014 | Yang | G06K 7/10158 |
| | | | | 455/41.1 |
| 2015/0207207 | A1* | 7/2015 | Park | H01Q 1/243 |
| | | | | 343/702 |
| 2015/0303561 | A1* | 10/2015 | Yang | H04B 5/79 |
| | | | | 29/600 |
| 2016/0043461 | A1* | 2/2016 | Murayama | H01Q 1/243 |
| | | | | 343/702 |
| 2016/0086159 | A1* | 3/2016 | Golla | G06Q 20/3226 |
| | | | | 705/76 |
| 2016/0140537 | A1* | 5/2016 | Salcedo | G06Q 30/04 |
| | | | | 705/44 |

(Continued)

FOREIGN PATENT DOCUMENTS

| | | |
|---|---|---|
| CN | 211858883 U | 11/2020 |
| JP | 2009253797 A | 10/2009 |
| WO | 2017206470 A1 | 12/2017 |

*Primary Examiner* — April G Gonzales
(74) *Attorney, Agent, or Firm* — Slater Matsil, LLP

(57) ABSTRACT

A near-field communication antenna includes a conductive plane; and four slots in the conductive plane.

20 Claims, 3 Drawing Sheets

(56) References Cited

U.S. PATENT DOCUMENTS

| | | | |
|---|---|---|---|
| 2016/0285520 A1* | 9/2016 | Baek | H01Q 1/243 |
| 2016/0358172 A1* | 12/2016 | Ziat | G06Q 20/227 |
| 2016/0360352 A1* | 12/2016 | Khan | H04W 4/80 |
| 2017/0142159 A1* | 5/2017 | Li | G06Q 20/3227 |
| 2018/0123221 A1* | 5/2018 | Finn | H01Q 1/2225 |
| 2018/0331429 A1* | 11/2018 | Kornaros | H01Q 9/0414 |
| 2018/0341847 A1* | 11/2018 | Finn | G06K 19/07783 |
| 2019/0034912 A1* | 1/2019 | Wilson | G06Q 20/354 |
| 2019/0305824 A1* | 10/2019 | Antonetti | H04B 5/263 |

* cited by examiner

NFC ANTENNA

CROSS-REFERENCE TO RELATED APPLICATIONS

This application is a continuation of U.S. patent application Ser. No. 16/850,383, filed Apr. 16, 2020, which application claims priority to European Patent Application No. 19171840.2, filed on Apr. 30, 2019, which applications are hereby incorporated herein by reference.

TECHNICAL FIELD

The present disclosure generally concerns electronic devices and, more specifically, devices integrating a near-field communication (NFC) antenna. The present disclosure more particularly tackles NFC antennas used for point of sale (POS) and mobile point of sale (mPOS) applications.

BACKGROUND

Near-field radio frequency communication systems are becoming increasingly common, particularly since the development of near-field communication technologies according to ISO 14443 standard or the NFC Forum. Such systems use a radio frequency electromagnetic field, emitted by an antenna of a device (terminal or reader), to communicate with another device (card or tag).

NFC antennas are usually required to cope with challenging environments. Several constraints, such as a reduced available space, a limited supply voltage for the NFC system, and a disturbing ambient electric noise, frequently reduce the performance of such antennas.

SUMMARY

There is a need to improve the performance of existing near-field communication antennas.

One embodiment addresses all or some of the drawbacks of known near-field communication antennas.

One embodiment provides a near-field communication antenna comprising:
 a conductive plane; and
 four slots in the conductive plane.

According to an embodiment, the above-described antenna is capable of meeting the EMVCo standard.

According to an embodiment, the four slots have a length comprised between approximately 20 mm and approximately 50 mm, preferably between 20 mm and 50 mm.

According to an embodiment, the four slots have a length preferably around 40 mm, preferably equal to 40 mm.

According to an embodiment, the four slots have a width comprised between approximately 1 mm and approximately 3 mm, preferably between 1 mm and 3 mm.

According to an embodiment, the four slots have a width preferably around 1 mm, preferably equal to 1 mm.

According to an embodiment, the four slots form a square whose sides are non-contiguous.

According to an embodiment, the four slots of the antenna are equidistant from the middle of the square by a length of approximately 25 mm.

According to an embodiment, the four slots are joined together by two additional internal slots in the conductive plane, the internal slots being perpendicular to each other and forming the arms of a cross centered on the middle of the square.

According to an embodiment, the above-described antenna further comprises a hole centered on the middle of the square.

According to an embodiment, the four slots are joined to the hole by four additional internal slots.

According to an embodiment, one of the internal slots extends to an edge of the conductive plane.

One embodiment provides an electronic device comprising an antenna such as the above-described antenna.

One embodiment provides a point of sale terminal comprising such a device.

One embodiment provides a mobile phone comprising such a device.

According to an embodiment, the hole is facing a wireless charging module of the mobile phone.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the communication protocols (electromagnetic field modulation techniques), be they secure or non-secure, between the device and the outside have not been detailed, the described embodiments being compatible with usual techniques of generation and of modulation of radio frequency signals for near-field communication.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
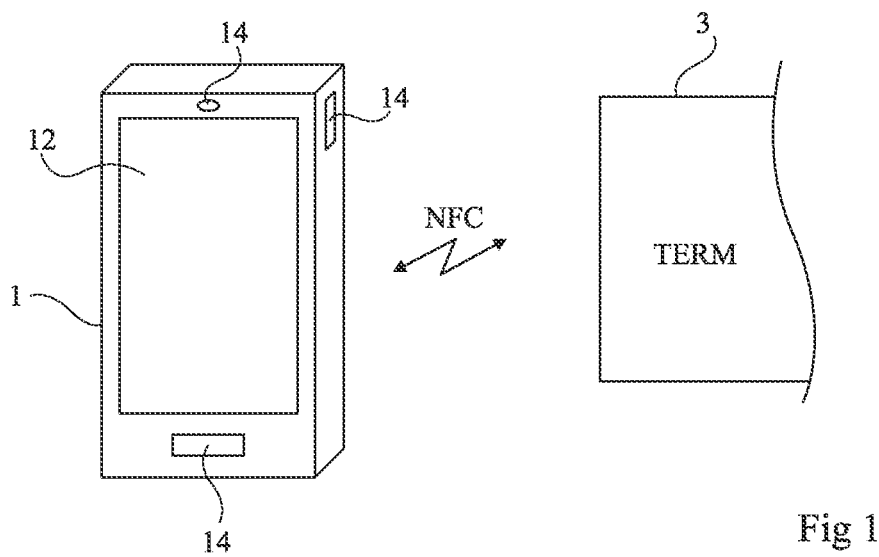
FIG. 1 schematically shows, in the form of blocks, an example of a near-field communication system of the type to which the described embodiments apply.

FIG. 1 schematically shows, in the form of blocks, an example of a near-field communication system of the type to which the described embodiments apply.

Near-field communication (NFC) circuits can especially be found in communicating electronic devices of the type of cell phone 1. Typically, a cell phone or smartphone, equipped with NFC functionalities, is capable of communicating not only over the wireless telephone network (for example, GSM) or according to medium-range radio frequency protocols (for example, Wi-Fi, Bluetooth), but also in near-field (also called contactless mode), in quasi-contact at 4 to 5 centimeters, according to standards, for example ISO 14443 or NFC Forum. Reference will be made hereafter to an NFC device to designate a device integrating near-field contactless communication functionalities.

The NFC device (telephone 1 in FIG. 1) is capable of communication by near-field electromagnetic coupling with another NFC device 3. This other device 3, for example, a terminal (TERM), radiates a magnetic field intended to be captured by the NFC circuits of the phone. Although the case of a telephone 1 and of a terminal 3 (for example, a contactless payment terminal) is considered, all that will be described more generally applies to any system where an electromagnetic transponder or NFC device detects an electromagnetic field radiated by a reader or terminal. In other words, the embodiments apply to any system where two NFC devices 1 and 3 are capable of communication by near-field electromagnetic coupling.

According to applications, for a communication, one of the devices operates in so-called reader mode while the other operates in so-called card mode, or the two devices communicate in peer-to-peer mode (P2P). Each device 1, 3 comprises various electronic circuits, among which a circuit forming a near-field communication interface, or NFC interface, between the NFC device and the outside. Such an interface is used, among others, in reader mode, to generate a radio frequency signal transmitted by an antenna and, in card mode, to decode a detected radio frequency signal. The radio frequency field generated by one of the devices is detected by the other device, which is located within its range and which also comprises an antenna.

In the example of a smartphone-type mobile terminal 1, the latter comprises at least one display 12 as well as elements 14 (buttons, keys, print sensor, touch-screen, cameras, etc.) forming user interface elements.

Figure 2:
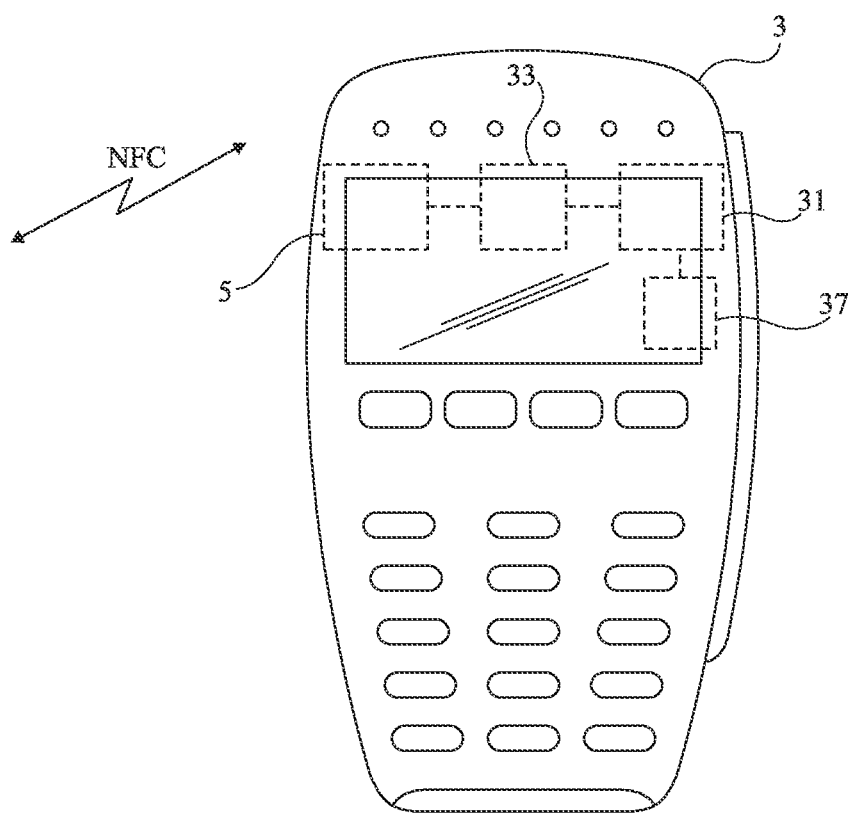
FIG. 2 schematically shows, in the form of blocks, an example of a near-field contactless payment terminal.

FIG. 2 schematically shows, in the form of blocks, an example of a near-field contactless payment terminal 3.

In the example of FIG. 2, the near-field contactless payment terminal 3 is capable of communication by near-field electromagnetic coupling with another NFC device (for example, the telephone 1 in FIG. 1, a contactless payment card, a NFC tag etc.). The terminal 3 typically comprises (represented in dotted lines):
- a NFC controller 31 or router;
- a matching circuit 33 or network, capable of filtering electromagnetic interference (EMI);
- an antenna 5, capable of receiving or transmitting signals; and
- other circuits or components depending on the desired application, represented in FIG. 2 by block 37.

The near-field operation of terminal 3 is generally based on the use of the NFC controller 31 associated with a contactless front end (CLF). The controller 31 communicates, on the one hand, with the transmit/receive antenna 5 and, on the other hand, with a host circuit or host processor, represented by block 37 in the example of FIG. 2. The host circuit 37 is, for example, capable of relaying information between the controller/router 31 and different applications hosted by terminal 3.

Among such applications, some are so-called secure applications (as opposed to non-secure applications) which use specific validation or control circuits. Such secure applications are then totally or partly hosted by specific circuits commonly called secure elements (not shown in FIG. 2) which are provided with processing and/or key/code/signature/etc. storage circuits enabling to validate/process/authenticate/etc. a secure operation or transaction. For example, a secure transaction is a payment operation (a contactless payment operation), an access control operation, an application or peripheral unlocking operation, etc.

The controller 31 particularly contains a routing table defining the parameters and communication channels between the radio frequency contactless front end and the elements of terminal 3 according to the executed application. Such a routing table enables the host circuit 37 to correctly route communications towards the different elements and enables the controller 31 to correctly transmit the communications received from circuit 37. In certain cases, secure elements are capable of directly communicating with the controller 31 without passing through the host circuit 37.

Usually, the antenna of terminal 3 is a loop antenna consisting of a loop or coil of conductive wire (not shown). The conductive wire of a loop antenna is generally made of copper or aluminum. Such type of antenna is notably sensitive to ambient electromagnetic noise emitted by the surrounding environment.

Mobile devices, such as telephone 1 (FIG. 1), also usually comprise loop antennas. In mobile devices 1, it is critical to embed the smallest antenna as possible. Moreover, most of the mobile devices 1 have a metallic casing and also encompass several metallic parts. This also reduces the performance of a loop antenna because of eddy currents circulating inside this metallic casing and/or inside these metallic parts. A high output power is thus generally required in order to compensate for the losses by eddy currents. These eddy currents circulating in metallic surrounding parts and/or casing often lead to a low radiofrequency (RF) performance of the loop antenna, which reduces the chances to successfully pass the EMVCo certification tests.

According to the disclosed embodiments, the loop antenna is replaced by a slot antenna 5 configured for operating in NFC frequency range.

Figure 3:
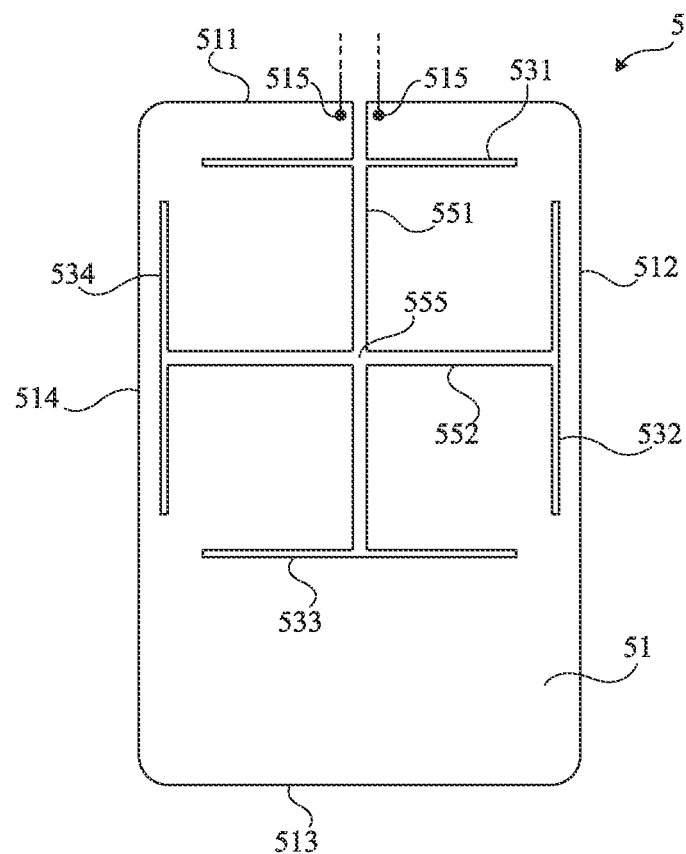
FIG. 3 illustrates an embodiment of a NFC slot antenna.

FIG. 3 illustrates an embodiment of a NFC slot antenna 5.

According to this embodiment, the NFC slot antenna 5 comprises a conductive plane 51, which is preferably made of copper. In this plane 51, slots are formed according to a specific pattern. In the embodiment of FIG. 3:
- four external slots 531, 532, 533, and 534 are arranged in such a way as to form a square shape, whose sides are disjoint or non-contiguous; and
- two internal slots 551 and 552 are arranged in such a way as to form a cross shape, centered with respect to the above-described square, whose arms are orthogonal to the four external slots 531, 532, 533, and 534.

In other words, the two internal slots 551 and 552 form the arms of a "cross potent" or "crutch cross" with one of the external slots 531, 532, 533, and 534 at each of its four ends.

All four external slots 531, 532, 533, and 534 do not intersect nor touch each other. The two internal slots 551 and 552, however, intersect perpendicularly in the middle 555 of the square formed by the four external slots 531, 532, 533, and 534. The internal slot 551 hence meets the two parallel external slots 531 and 533 in their middle. Furthermore, the internal slot 552 meets the two parallel external slots 532 and 534 in their middle.

According to the embodiment of FIG. 3, the conductive plane 51 of the NFC slot antenna 5 has a rectangular shape with rounded corners. The cross potent shape, formed by the external slots 531, 532, 533, and 534 and the internal slots 551 and 552, is closer to one of the two narrow sides of plane 51 (in FIG. 3, the top/upper side 511) than to the other narrow side of plane 51 (in FIG. 3, the bottom/lower side 513). The external slots 531 and 533 are preferably parallel to both narrow sides 511, 513 of plane 51. The middle 555 of the square formed by the four external slots 531, 532, 533, and 534 is preferably equidistant to both long sides 512, 514 of plane 51.

One of the internal slots, for example slot 551, extends to an edge of plane 51, in this case, the narrow side 511 of plane 51. In other words, the slot 551 separates or cuts, partially and longitudinally, the plane 51 of antenna 5 in two halves. The slot 551 thus only opens onto the top narrow side 511 of plane 51, whereas it does not open onto the narrow side 513 of plane 51. Two contact pick-up pads 515, one on each side of slot 551, are located close to where slot 551 opens onto the narrow side 511 of plane 51.

The internal slot 551 hence opens:
at one end, onto the narrow side 511 of plane 51; and
at the other end, onto the external slot 533.
Meanwhile, the internal slot 552 opens:
at one end, onto the external slot 532; and
at the other end, onto the external slot 534.

According to a particular example of the embodiment of FIG. 3, the conductive plane 51 of the NFC antenna 5 has:
a length of around 80 mm, preferably equal to 80 mm; and
a width of around 58 mm, preferably equal to 58 mm.

The external slots 531, 532, 533, and 534 preferably have a large length to width ratio. In the embodiment of FIG. 3, the four external slots 531, 532, 533, and 534 have:
a length comprised between approximately 20 mm and approximately 50 mm, preferably between 20 mm and 50 mm, preferably around 40 mm, preferably equal to 40 mm; and
a width comprised between approximately 1 mm and approximately 3 mm, preferably between 1 mm and 3 mm, preferably around 1 mm, preferably equal to 1 mm.

In the embodiment of FIG. 3, the external slots 531, 532, 533, and 534 are equidistant to the middle 555 of the square they form by a distance of approximately 25 mm, preferably equal to 25 mm.

The slot antenna 5 can operate at frequencies suitable for NFC applications, for example at a frequency of around 13.56 MHz.

A NFC slot antenna, such as antenna 5 depicted in FIG. 3, is mechanically stronger than a loop antenna. The design of NFC slot antenna 5 also leads to fewer losses. The NFC slot antenna 5 can therefore operate at a lower output power than the power required to operate a loop antenna.

Thanks to its particular geometry, which provides an extended conductive area compared to loop antennas, the antenna 5 also produces a favorable loading effect on the antenna usually used for the measurement test bench of the standard EMVCo, called EMVCo PICC antenna. This advantage greatly improves the fulfillment of the standard conditions by the antenna 5 and facilitates the respect of the EMVCo certification tests.

Moreover, the antenna 5 is characterized by a lower quality factor than loop antennas, hence allowing one to avoid the use of damping resistors in order to reduce the quality factor. The antenna 5 also provides a way to easily focus a magnetic field according to required testing positions, by simply placing the external slots 531, 532, 533, and 534 at specific locations.

Figure 4:
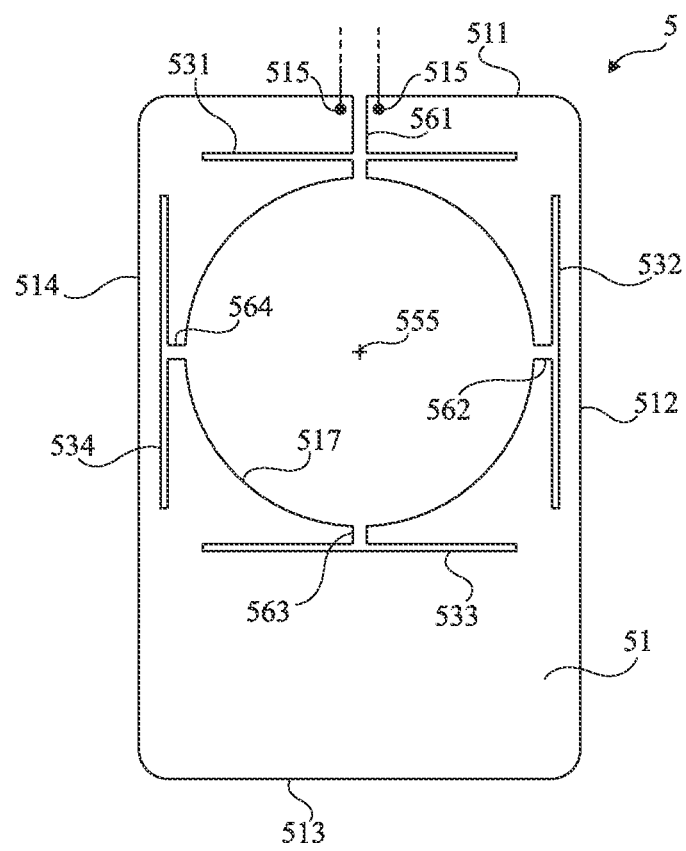
FIG. 4 illustrates another embodiment of a NFC slot antenna.

FIG. 4 illustrates another embodiment of a NFC slot antenna.

According to this preferred embodiment, the NFC slot antenna 5 also comprises the conductive plane 51, which is preferably made of copper. In this plane 51, several slots and a hole are formed according to a specific pattern. In the embodiment of FIG. 4:
four external slots 531, 532, 533, and 534 are arranged in such a way as to form a square shape, whose sides are disjoint or non-contiguous as in the embodiment of FIG. 3;
a round/circular hole 517 is centered on the middle 555 of the above-described square shape; and
four internal slots 561, 562, 563, and 564 are arranged in such a way as to respectively join each of the four external slots 531, 532, 533, and 534 with the hole 517.

All four external slots 531, 532, 533, and 534 do not intersect nor touch each other. The four internal slots 561, 562, 563, and 564 are arranged in such a way that:
the internal slot 561 meets the external slot 531 perpendicularly in its middle and one end of the internal slot 561 opens onto the hole 517;
one end of the internal slot 562 meets the external slot 532 perpendicularly in its middle and the other end of the internal slot 562 opens onto the hole 517;
one end of the internal slot 563 meets the external slot 533 perpendicularly in its middle and the other end of the internal slot 563 opens onto the hole 517; and
one end of the internal slot 564 meets the external slot 534 perpendicularly in its middle and the other end of the internal slot 564 opens onto the hole 517.

The antenna 5 of FIG. 4 is similar to the antenna 5 of FIG. 3, except that the antenna 5 of FIG. 4 features a hole 517 in its conductive plane 51. A NFC slot antenna 5 like the one depicted in FIG. 4 can therefore be easily obtained/produced from the slot antenna 5 of FIG. 3 by making, through the plane 51, a hole 517 centered inside the square formed by the four external slots 531, 532, 533, and 534. The fabrication/manufacturing of the NFC slot antenna 5 of FIG. 4 can consequently be facilitated in this way.

According to the embodiment of FIG. 4, the conductive plane 51 of the NFC slot antenna 5 has a rectangular shape with rounded corners. The squared shape formed by the external slots 531, 532, 533, and 534, with the hole 517 centered on its middle 555, is closer to one of the two narrow sides of plane 51 (in FIG. 4, the top/upper side 511) than to the other narrow side of plane 51 (in FIG. 4, the bottom/lower side 513). The external slots 531 and 533 are preferably parallel to both narrow sides 511, 513 of plane 51. The middle 555 of the square formed by the four external slots 531, 532, 533, and 534 is preferably equidistant to both long sides 512, 514 of plane 51. It is worth noting that the middle 555 of the above-mentioned square, formed by the four external slots 531, 532, 533, and 534, is coincident with the center of the circular hole 517 of plane 51.

One of the internal slots, for example slot 561, extends to an edge of plane 51, in this case, the narrow side 511 of plane 51. In other words, the slot 561 separates or cuts, partially and longitudinally, the plane 51 of antenna 5 in two halves. The slot 561 thus not only opens onto the top narrow side 511 of plane 51, but also onto the round hole 517. Two contact pick-up pads 515, one on each side of slot 561, are located close to where slot 561 opens onto the narrow side 511 of plane 51.

The internal slot 562 opens:
at one end, onto the round hole 517; and
at the other end, onto the external slot 532.
The internal slot 563 opens:
at one end, onto the round hole 517; and
at the other end, onto the external slot 533.
The internal slot 564 opens:
at one end, onto the round hole 517; and
at the other end, onto the external slot 534.

According to a particular example of the embodiment of FIG. 4, the conductive plane 51 of the NFC antenna 5 has:
a length of around 80 mm, preferably equal to 80 mm; and
a width of around 58 mm, preferably equal to 58 mm.

The external slots 531, 532, 533, and 534 preferably have a large length to width ratio. In the embodiment of FIG. 4, the four external slots 531, 532, 533, and 534 have:
a length comprised between approximately 20 mm and approximately 50 mm, preferably between 20 mm and 50 mm, preferably around 40 mm, preferably equal to 40 mm; and
a width comprised between approximately 1 mm and approximately 3 mm, preferably between 1 mm and 3 mm, preferably around 1 mm, preferably equal to 1 mm.

In the embodiment of FIG. 4, the external slots 531, 532, 533, and 534 are equidistant to the center of the hole 517 by a distance of approximately 25 mm, preferably equal to 25 mm.

The slot antenna 5 depicted in FIG. 4 can operate at frequencies suitable for NFC applications, for example at a frequency of around 13.56 MHz.

A NFC slot antenna, such as antenna 5 depicted in FIG. 4, is mechanically stronger than a loop antenna. The design of NFC slot antenna 5 also leads to fewer losses. The NFC slot antenna 5 can therefore operate at a lower output power than the power required to operate a loop antenna.

Thanks to its particular geometry, which provides an extended conductive area compared to loop antennas, the antenna 5 also produces a favorable loading effect on the antenna usually used for the measurement test bench of the standard EMVCo, called EMVCo PICC antenna. This advantage greatly improves the fulfillment of the standard conditions by the antenna 5 and facilitates the respect of the EMVCo certification tests.

Moreover, the antenna 5 is characterized by a lower quality factor than loop antennas, hence allowing one to avoid the use of damping resistors in order to reduce the quality factor. The antenna 5 also provides a way to easily focus a magnetic field according to required testing positions, by simply placing the external slots 531, 532, 533, and 534 at specific locations.

The NFC slot antenna 5 depicted in FIG. 4 has:
a parallel inductance of around 140 nH;
a parallel resistance of around 0.4Ω; and
a parasitic capacitance of around 5.8 pF.

Figure 5:
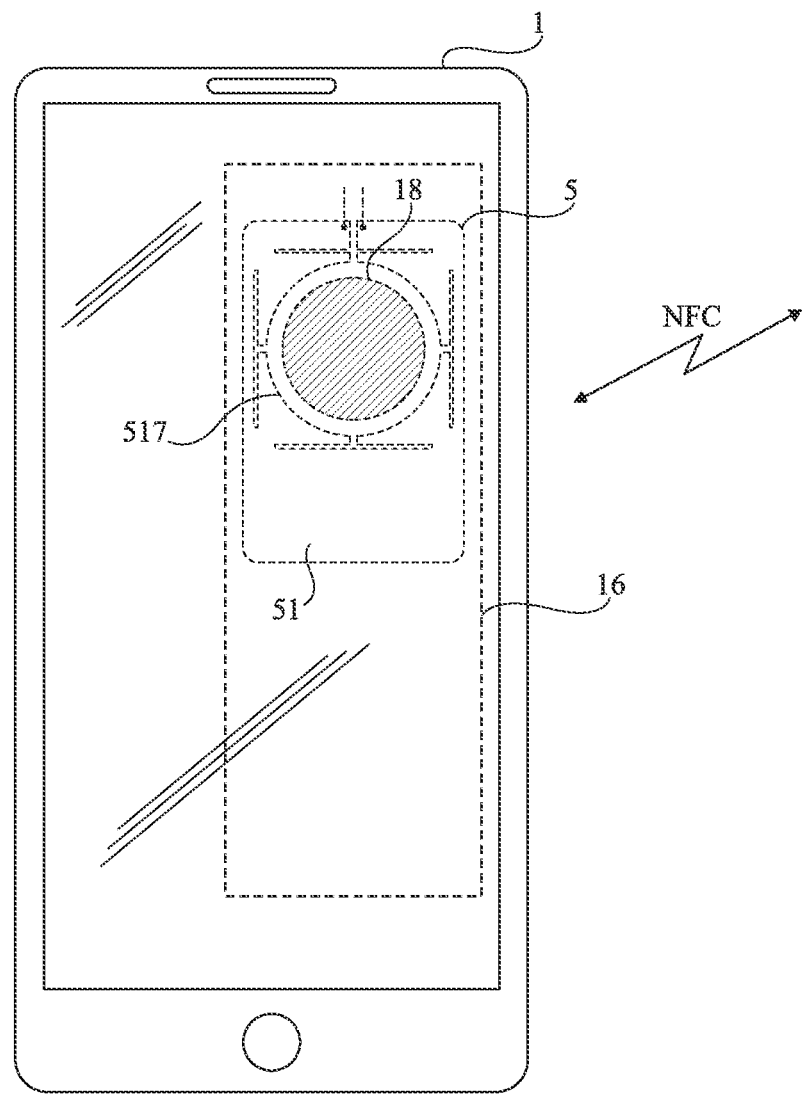
FIG. 5 schematically shows, in the form of blocks, an example of a mobile phone comprising a NFC slot antenna of the type to which the described embodiments apply.

FIG. 5 schematically shows, in the form of blocks, an example of a mobile phone comprising a NFC slot antenna of the type to which the described embodiments apply.

In FIG. 5, a smartphone, for example, the mobile phone 1 depicted in FIG. 1, is equipped with a NFC slot antenna such as the antenna 5 of FIG. 4. The antenna 5 is, in this example, mounted on a motherboard 16 (represented by a dotted rectangle in FIG. 5) of smartphone 1. This motherboard also features a wireless/inductive charging module 18 (represented by a hatched circle in FIG. 5).

In FIG. 5, the antenna 5 is arranged such that the hole 517, inside the plane 51 of antenna 5, is facing the wireless charging module 18. The hole 517 is preferably facing an antenna of the wireless charging module 18. This allows both the wireless charging module 18 and the NFC slot antenna 5 to exchange signals with the outside of smartphone 1 without interfering with each other. Furthermore, using a NFC slot antenna 5 can allow one to save valuable space inside smartphone 1.

Various embodiments and variants have been described. Those skilled in the art will understand that certain features of these embodiments can be combined and other variants will readily occur to those skilled in the art. In particular, the geometry of the NFC antenna 5 can be tuned in order to meet other requirements. For example, one can adjust to his needs the dimensions and locations of the slots 531, 532, 533, 534, 551, 552, 561, 562, 563, and 564, the radius and the position of the center 555 of the hole 517, the overall dimensions of plane 51, etc. In broad terms, the design of the slot antenna 5 can be adapted to fit another application.

Finally, the practical implementation of the embodiments and variants described herein is within the capabilities of those skilled in the art based on the functional description provided hereinabove.

What is claimed is:

1. A near-field communication (NFC) payment terminal comprising:
a slot antenna configured for operating in an NFC frequency range;
a matching circuit coupled to the slot antenna;
a controller coupled to the matching circuit; and
a host circuit coupled to the controller, wherein the slot antenna comprises a rectangular conductive plane, wherein the rectangular conductive plane comprises four slots joined together in a first cross pattern, wherein one of the four slots is parallel to and is open to an edge of a narrow side of the rectangular conductive plane in a second cross pattern, and wherein the one of the four slots forms an intersecting element of the second cross pattern.

2. The NFC payment terminal of claim 1, wherein the NFC payment terminal comprises a mobile phone.

3. The NFC payment terminal of claim 1, wherein the matching circuit is configured for filtering electromagnetic interference (EMI).

4. The NFC payment terminal of claim 1, wherein the slot antenna is configured for meeting an EMVCo standard.

5. The NFC payment terminal of claim 1, wherein the four slots comprise a square whose sides are non-contiguous.

6. The NFC payment terminal of claim 5, wherein the four slots are joined together by two additional internal slots, the additional internal slots being perpendicular to each other and forming arms of a cross centered on a middle of the square comprising the first cross pattern.

7. The NFC payment terminal of claim 1, wherein the four slots are joined to a central hole.

8. The NFC payment terminal of claim 7, wherein the four slots are joined to the central hole by four additional internal slots.

9. The NFC payment terminal of claim 8, wherein one of the four additional internal slots extends to an edge of a conductive plane of the slot antenna.

10. The NFC payment terminal of claim 7, wherein the NFC payment terminal comprises a mobile phone, wherein the central hole faces a wireless charging module of the mobile phone.

11. The NFC payment terminal of claim 1, wherein the controller comprises a routing table.

12. The NFC payment terminal of claim 11, wherein the routing table is configured for routing communications to a plurality of elements of the NFC payment terminal.

13. The NFC payment terminal of claim 12, wherein the controller is configured for directly communicating with secure elements of the NFC payment terminal without passing through the host circuit.

14. The NFC payment terminal of claim 1, wherein one of the four slots is parallel to and is open to a bottom edge of the narrow side of the rectangular conductive plane.

15. A method of near-field communications (NFC) of a NFC payment terminal, the method comprising:
receiving NFC communications at the NFC payment terminal through a slotted antenna;
processing NFC communications in the NFC payment terminal received by the slotted antenna; and
transmitting the processed NFC communications at the NFC terminal through the slotted antenna,
wherein the slotted antenna comprises a rectangular conductive plane and four slots in the rectangular conductive plane joined together in a first cross pattern, wherein one of the four slots is parallel to and open to an edge of a narrow side of the rectangular conductive plane in a second cross pattern, and wherein the one of the four slots forms an intersecting element of the second cross pattern.

16. The method of claim 15, further comprising configuring the slotted antenna to meet an EMVCo standard.

17. The method of claim 15, further comprising forming the four slots to form a square whose sides are non-contiguous.

18. The method of claim 17, further comprising joining the four slots together by two additional internal slots in the rectangular conductive plane, the two additional internal slots being perpendicular to each other and forming arms of a cross centered on a middle of the square comprising the first cross pattern.

19. The NFC payment terminal of claim 15, wherein one of the four slots is parallel to and is open to a bottom edge of the narrow side of the rectangular conductive plane.

20. A near-field communication (NFC) payment terminal comprising:
a slot antenna configured for operating in an NFC frequency range, wherein the slot antenna comprises a plurality of perpendicular slots joined together in a first cross pattern, and wherein one of the plurality of perpendicular slots is parallel to and open to a bottom edge of a narrow side of a rectangular conductive plane in a second cross pattern, and wherein the one of the plurality of perpendicular slots forms an intersecting element of the second cross pattern;
a matching circuit coupled to the slot antenna, wherein the matching circuit is configured for filtering electromagnetic interference (EMI); and
a controller or router coupled to the matching circuit, wherein the controller or the router is configured for directly communicating with secure elements of the NFC payment terminal.

\* \* \* \* \*